Feb. 1, 1949.  C. ROEHRI  2,460,658
RECIPROCATING AND LOCKING MEANS FOR DIES OR THE LIKE
Filed June 9, 1945  3 Sheets-Sheet 1
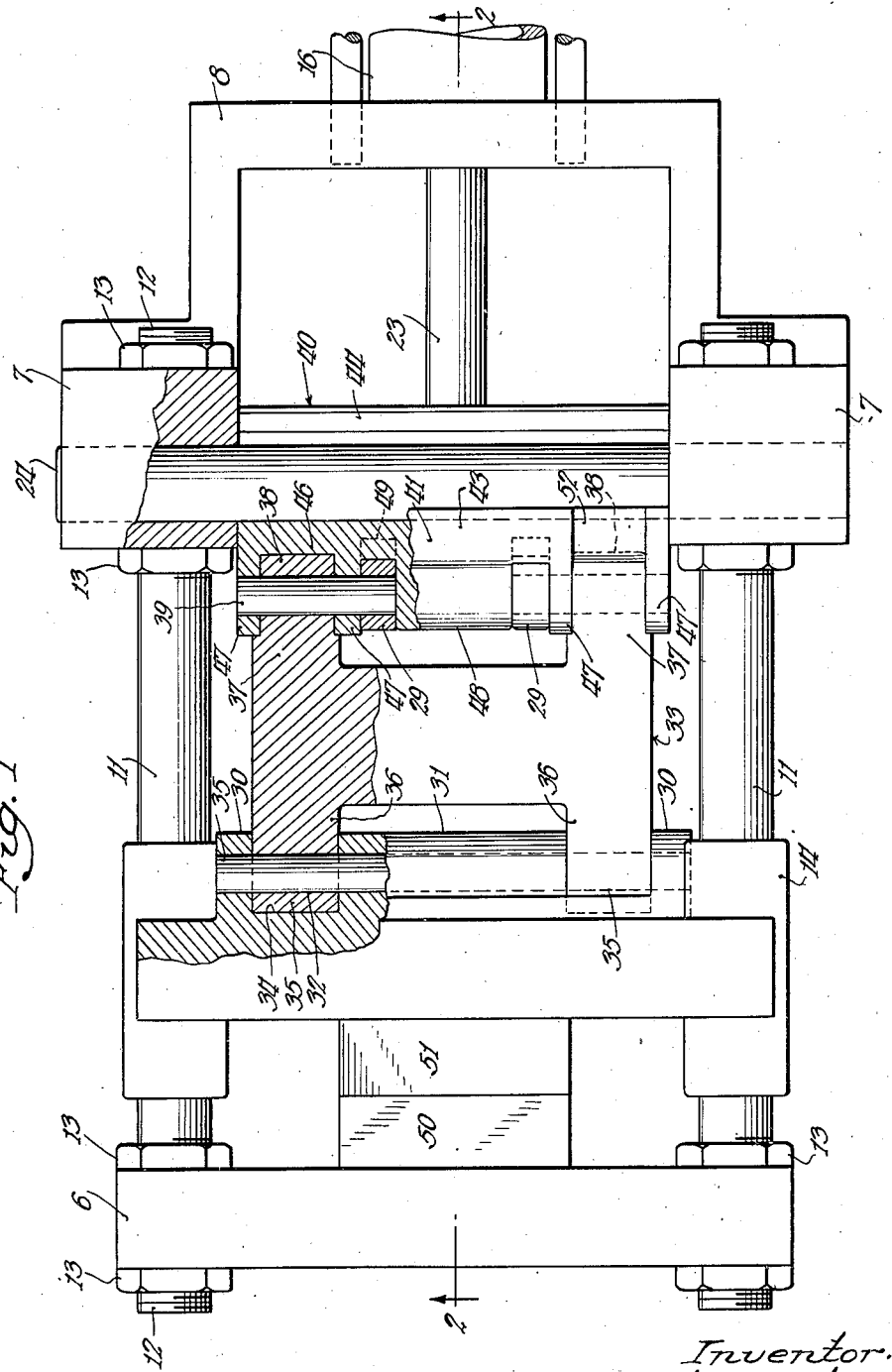

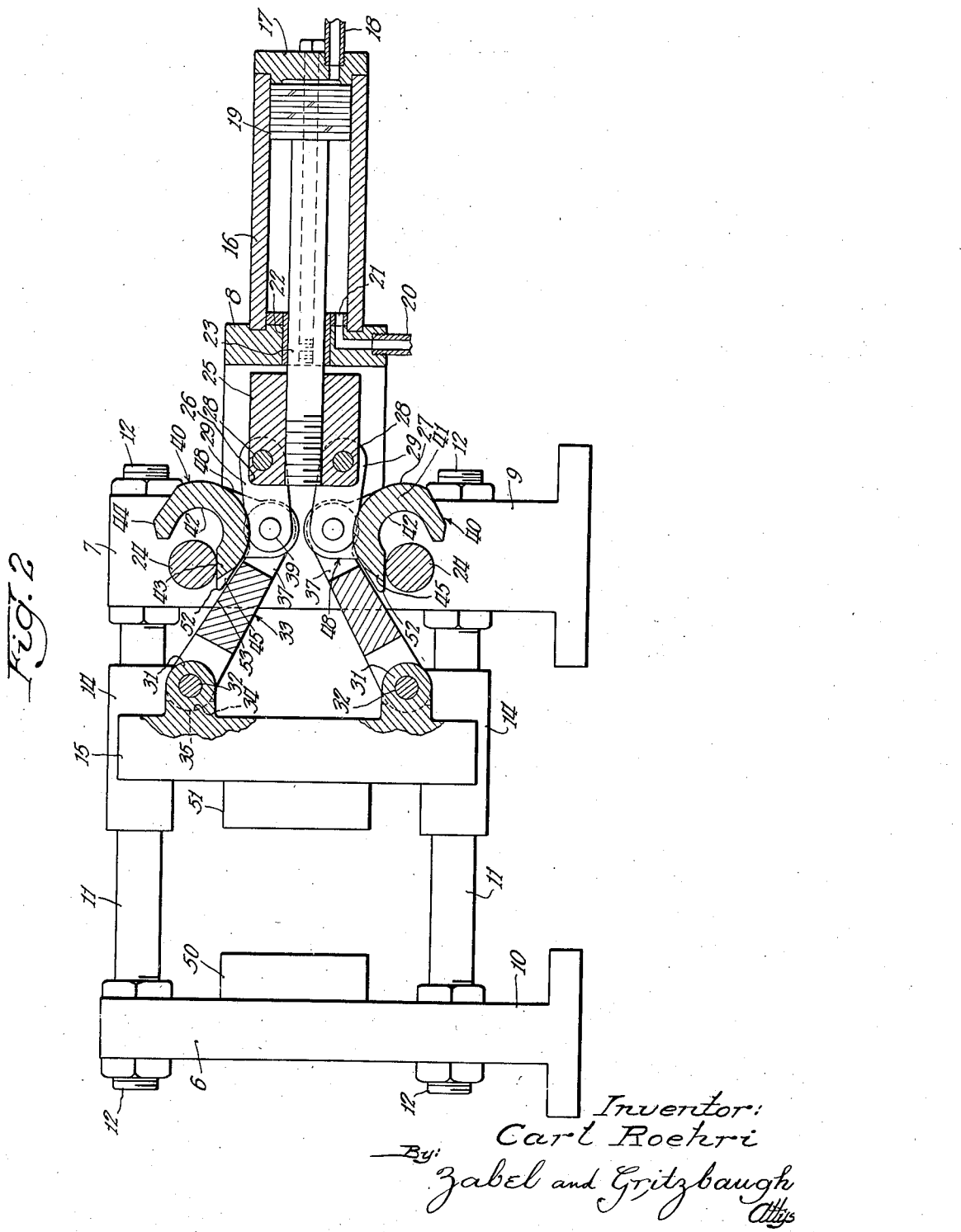

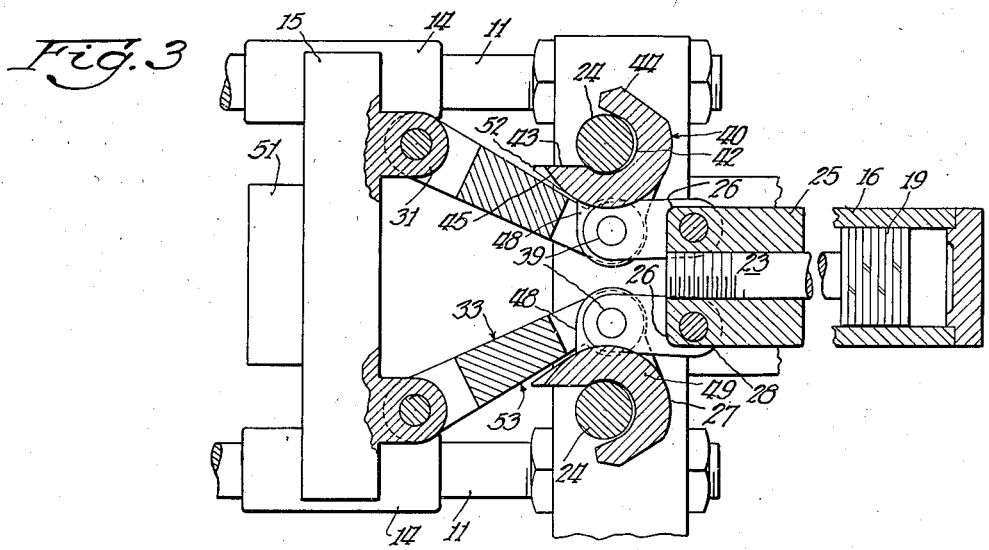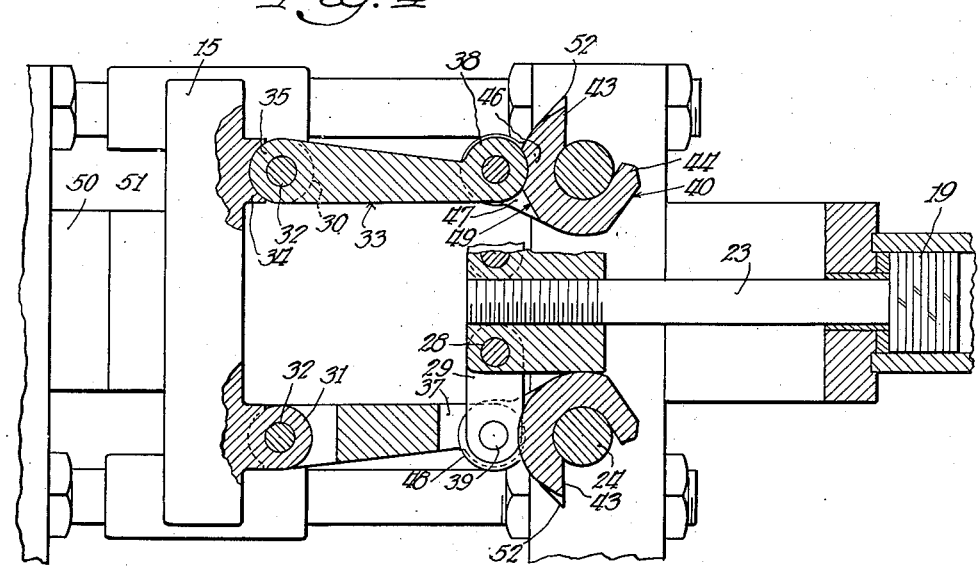

Patented Feb. 1, 1949

2,460,658

UNITED STATES PATENT OFFICE 2,460,658

RECIPROCATING AND LOCKING MEANS FOR DIES OR THE LIKE

Carl Roehri, Chicago, Ill.

Application June 9, 1945, Serial No. 598,546

18 Claims. (Cl. 74—106)

My invention relates to locking devices for members that are movable into and out of a predetermined position, such as the head of a press or die casting machine, or similar device, in which a movable head carries a die, or similar member, that is adapted to be moved into cooperative relation to another die or similar member.

It is a purpose of my invention to provide means for moving such a member back and forth into and out of such cooperative relation to another member and locking the same in position at the end of its movement in one direction, said position being that in which said member is in cooperative relation to a cooperating fixed member.

It is a particular purpose of my invention to provide means for moving and locking a member in the above referred to manner, comprising a frame having guiding means for said member, actuating means for said member comprising a reciprocable member, and means connecting said reciprocable member and the guided member including links that are pivotally connected with said guided member which are connected with the reciprocable member, crank-like members that are pivotally connected with said links and which are adapted to engage with fixed shafts on the frame so as to swing around the axes of said shafts to align the pivots connecting the links and the crank-like members with the axes of said shafts and the pivots connecting the links and the member that is to be locked in a certain position.

It is a further purpose of my invention to provide a moving and locking means for such a member as above referred to that will operate in any position and which can provide as wide an opening in the machine between the fixed and movable members as may be desired. In order to accomplish this the above referred to links are made long and the length of these links can be varied as may be desired to get the opening between the fixed and movable die or similar members that may be desired, without in any manner interfering with the locking action of the mechanism.

It is an important purpose of my invention to provide a mechanism of the above mentioned character, in which the load that is created, for example, in a die casting machine by the pressure of the metal entering the dies, is taken off the pivots above referred to and is transferred directly through the members to the shafts fixed on the frame from the head or similar member that carries the die or other part to which the load is being applied. This is accomplished by providing enlargements or rounded heads on the ends of the links that fit in corresponding sockets in the crank-like members and in suitable formations on the member that is moved into and out of locking position, said enlargements or rounded heads being seated in said sockets when the parts are in locking position so as to transfer the load directly through the material of the links and the crank-like members to the fixed shafts and thus to the frame.

It is a further purpose of my invention to provide a mechanism of the above mentioned character having a member that is reciprocated by means of a piston operating in a cylinder, which is actuated by fluid pressure means, to which short links are pivotally connected, which in turn are connected with the long links that are pivoted to the member that is to be moved back and forth and locked in position at the end of its movement in one direction, the pivotal connection between said links also serving as a pivotal mounting for the crank-like members that have hook-line bearing portions that are movable into and out of engagement with the fixed shaft-like members above referred to, and to provide means for guiding said hook-like bearing members into engagement with said fixed shaft-like members in one direction of movement of the parts and out of engagement therewith in a position to be readily again engaged therewith upon movement of the parts in the reverse direction.

Other objects and advantages of my invention will appear as the description of the drawings proceeds. I desire to have it understood, however, that I do not intend to limit myself to the particular details shown or described, except as defined in the claims.

In the drawings:

Fig. 1 is a top plan view partly in section of my improved means for moving a member into a predetermined position and locking it in such position, the operating cylinder being partly broken away showing the parts in locking position.

Fig. 2 is a view in longitudinal section taken on a line corresponding substantially to the line 2—2 of Fig. 1, but showing the parts in an unlocked position with the movable member in its furthest withdrawn position from the stationary cooperating member.

Fig. 3 is a fragmentary sectional view showing the operating mechanism in an intermediate position with the crank-like members ready to engage with the stationary shaft-like members, and Fig. 4 is a sectional view similar to Fig. 2 partly broken away, showing the parts in locking position.

Referring in detail to the drawings, my improved mechanism for moving a member into cooperative relation to another member and locking it against movement out of such cooperating relation comprises a frame having an end plate 6 and a pair of bar-like members 7, which are connected by means of a yoke-like member 8, one of said bar-like members 7 being provided with a base portion 9 and said plate-like member having a base portion 10, which base portions 9 and 10 are adapted to be mounted on a suitable support. The members 6 and 7 are connected by means of round bars 11, which are provided with threaded end portions 12, with which the nuts 13 cooperate to clamp said members 6 and 7 to said round bars and thus fix the parts 6, 7 and 11 relative to each other. Four of said round bars are provided, extending parallel to each other and slidably mounted on said round bars are the sleeves 14, which fit said round bars closely so as to accurately guide the movements of the head 15, extending between and fixed to said sleeve-like members 14 by welding or in any other similar manner, in its movements so that said head will have a straight line movement parallel to the axis of the round bars 11.

A cylinder 16 is fixedly mounted on the yoke-like member 8, the end of said cylinder being shown as being seated in a circular groove in the transverse portion of said yoke-like member and as being provided with a head 17 through which a conduit 18 enters for supplying fluid under pressure to the one side of the piston 19, said conduit serving, of course, to discharge fluid when fluid under pressure is supplied through the conduit 20 extending through the head 21 to the other side of the piston 19. A bearing sleeve 22 extends through the yoke 8 and through the head 21 to provide a sliding fit for the piston rod or plunger 23 fixed to the piston 19 in any suitable manner. It will be obvious that any suitable valve means can be provided for supplying the fluid under pressure to move the piston 19 in a desired direction.

A pair of fixed transversely extending shafts 24 is provided, extending between the bar-like members 7 of the frame in parallelism to each other. A block 25 is fixedly secured to the piston rod or plunger 23, the connection, preferably, being a screw-threaded one as shown in the drawings. The block 25 is provided with suitable openings for receiving the pivot pins 28 for pivotally connecting the links 29 with said block 25. It will be noted upon reference to Fig. 2 that when the piston 19 is at the limit of its movement in a return direction the links 29 will extend forwardly from the block 25 and slightly inwardly toward each other, while in the position shown in Fig. 4 when the piston 19 is at the limit of its forward movement the links 29 extend substantially in a straight line with each other transversely of the piston rod 23 and of the reciprocable member or block 25.

The head 15 is provided with a pair of pivot ears 30 on each end thereof adjacent the sleeve-like members 14 and with a long pivotal bearing 31 spaced from the ears 30 at each end of said head 15. A pivot pin 32 is mounted in the bearing member 31 and the ears 30 at each end of the head, and said pivot pin pivotally connects one end of each of the long links 33 with the head 15. Partly circular bearings 34 forming sockets for the rounded enlargements or heads 35 on the links 33 are provided on the member 15. There are two heads 35 on each link 33, as will be obvious from Figs. 1 and 4, and these have the pivot pins 32 extending therethrough, said heads 35 being provided on the arms 36 provided on each link 33. Each link 33 is also provided with a pair of oppositely extending arms 37, which are provided with rounded heads or enlargements 38 thereon, similar to the heads 35, which receive the pivot pins 39 connecting the links 29 to the links 33. It will be noted that the pivots 32 are in alignment with the stationary shafts 24.

Also mounted on the pivot pins 39 are crank-like members 40, there being one of said members 40 for each of the shafts 24. Each member 40 has a hook-like body portion 41 providing a partially circular bearing portion 42 on opposite sides of which lie forwardly extending portions 43 and 44, one of said forwardly extending portions 44 being beveled, as will be obvious from Figs. 2, 3 and 4, and being continuous between the frame members 7. The other forwardly extending portion 43 tapers to a blunt point 45 so as to provide a flaring mouth for the hook-like portion 41 leading into the bearing opening 42. Upon reference to Fig. 1 it will be noted that the forwardly extending portion 43 is interrupted so as to provide openings to receive the heads 38, bearing socket portions 46 being provided on the members 40, which are partially circular and receive the circular enlargements or heads 38 on the links 33 when the parts are in the position shown in Figs. 1 and 4. The rear portions of the members 40 are provided with a plurality of ears 47, through which the pivot pins 39 extend, said pivot pins thus connecting the ears 47 on the members 40 with the heads 38 and with the links 29, the links 29 at the ends thereof engaged by said pins 39 being received between the enlargement 48 on the rear end of each member 40 and one of the ears 47. The hook-like body portions of the members 40 are provided with recesses 49 to accommodate the links 29 when the parts are in the position shown in Fig. 2 and moved through the position shown in Fig. 3 toward the position shown in Fig. 4.

The links 33 may be made of any desired length to get the desired spacing between the head 15 and the fixed frame member 6 to get the proper spacing of the stationary die 50 and movable die 51, or other similar cooperating members 50 and 51 mounted, respectively, on the frame and on the movable member 15. It is sometimes desirable to get a very big spacing between the members 50 and 51 to accommodate a long part that may be formed between the dies 50 and 51 or which may be otherwise operated on by members 50 and 51 in an apparatus of the character described. Any size opening between the members 50 and 51 can be obtained that may be desired, by providing links 33 of the proper length and a cylinder 16 of such length that the stroke of the piston 19 can be made long enough to provide the length of stroke of the member 15 that is required for the desired opening. The forwardly extending portion 43 is provided with plane faced portions 52 aligning with the straight sides 53 of the links 33 so as to support said links in proper position when the parts are in the position shown in Fig. 2 to guide the same toward the position shown in Fig. 3. Said faces 52 and 53 also serve to guide the links 33 from the position shown in Fig. 4 to that shown in Fig. 2 as the return movement of the piston 19 takes place.

The member 25 is provided with rounded corners 26, which engage the rounded rear sides 27 of the hook-like crank members 40 as the member 25 moves from the position shown in Fig. 3 toward that shown in Fig. 4 to move the socket portions 42 thereof into engagement with the shafts 24. After such engagement has occurred said rounded corners and subsequently the side faces of the members 25, as movement toward the position shown in Fig. 4 continues, hold said hook-like members in engagement with said shafts. The rounded corners 26 also cooperate with the rounded rear sides 27 of the crank-like members 40 to guide the same as said members 40 move out of engagement with the shafts 24 and thus support the upper link 33 as viewed in the drawings as the parts move out of the position shown in Fig. 4, toward that shown in Fig. 3. At the same time the lower link 33 is supported by engagement of the faces 52 and 53 above referred to.

In operation, the initial position of the parts before the member 51 is moved toward and into cooperative relation with the member 50 is that shown in Fig. 2. As the piston 19 is moved toward the left in Fig. 2 the tapering end portions 45 of the hook-like members 40 are positioned between the stationary shafts 24 and the links 33 and are thus held in such position that the members 40 are guided into the position shown in Fig. 3. The bearing sockets 42 of the members 40 are next moved into engagement with the stationary shafts 24 and begin their rotational movement thereabound. As the crank-like members 40 swing around on the pivots 39 due to the movement of the block 25 toward the left, the pivots 39 are thrown outwardly away from each other and the links 29 finally assume a position perpendicular to the links 33 and to the axis of the piston rod or plunger 23. When this position is reached the pivots 32, 39 and the axes of the shafts 24 are in alignment. Also the rounded heads 35 and 38 are seated in the bearing sockets 34 and 46, and thus any pressure that will be exerted in the use of the mchanism on the head 15 will be transferred directly through the bearing sockets 34 and enlarged heads to the links 33, and through the enlarged heads 38 on these links to the bearing sockets 46 on the members 40. There will thus be no shearing force exerted on the pivots 32 and 39, but the pressure will be transferred directly through these parts from the head 15 to the fixed shafts 24 and thus to the frame.

The position of the parts when such alignment of the pivots as above referred to takes place is that shown in Figs. 1 and 4. The member 51 carried by the reciprocable head 15 is then locked in cooperative relation to the member 50 carried by the frame. Such position of the parts is maintained as long as may be desirable to carry out the operation that the members 50 and 51 perform. When it is desired to move the member 51 away from the member 50 fluid is supplied through the conduit 20 to move the piston 19 to the right in Fig. 4, whereupon the crank-like members 40 will be rotated around the shafts 24 toward the position shown in Fig. 3 and finally will be moved to the position shown in Fig. 2, the links 33 and said members 40 being supported and guided in their movements as above described and finally assuming the position shown in Fig. 2 ready to be moved to move the head 15 toward the frame member 6 to repeat the operation of bringing the member 51 into cooperating relation with the member 50 and to lock the same in such position.

What I claim is:

1. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and cranks pivotally connected with both said links and mounted to swing into engagement with and about said shafts to align the pivots connecting said links to each other with the pivots connecting said first mentioned links and said member and the axes of said shafts.

2. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and members pivotally connected with said links and having hook-like bearing portions detachably engaging with said shafts to swing said members about the same.

3. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and cranks pivotally connected with said links and having bearing portions thereon movable into engagement with said shafts to swing said cranks about said shafts to align the pivots connecting said links to each other with the pivots connecting said first mentioned links and said member and the axes of said shafts, as said end of the movement of said member in said one direction is reached, and movable out of engagement with said shafts during the movement of said member in the opposite direction.

4. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame having their axes in alignment with the pivotal connection between said member and said links, and means connected with the pivots connecting said links and detachably engaging said shafts to swing said last mentioned pivots each into a position between and in alignment with one of said axes and the pivot connecting said member and link aligning with said axis.

5. Means for moving a member back and forth and locking the same in position at the end of its movement in one direction, comprising a frame having means for constraining said member to movement in a straight line, reciprocable means, links pivotally connected with said member, links pivotally connected with said reciprocable means, pivots fixed on said frame in alignment each with a pivotal connection between one of said links and said member, members having hook-like bearing portions adapted to engage with said fixed pivots, and a common pivotal connection between a link connected with said reciprocable means, a link connected with said member and one of said members having said hook-like portion.

6. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame having their axes in alignment with the pivotal connection between said member and said links, and means connected with both said links and detachably engaging said shafts to swing the pivots connecting said links each into a position between and in alignment with one of said axes and the pivot connecting said member and link aligning with said axis.

7. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame, members pivotally connected with said links and having hook-like bearing portions detachably engaging with said shafts to swing said members about the same, and cooperating means on certain of said links and said members having the hook-like portions for guiding said bearing portions into engagement with said shafts.

8. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame, cranks pivotally connected with said links and having bearing portions thereon movable into engagement with said shafts to swing said cranks about said shafts to align the pivots connecting said links to each other with the pivots connecting said first mentioned links and said member and the axes of said shafts, and cooperating means on certain of said links and cranks for guiding said bearing portions into engagement with said shafts.

9. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame, cranks pivotally connected with said links and mounted to detachably engage and swing about said shafts to align the pivots connecting said links to each other with the pivots connecting said first mentioned links and said member and the axes of said shafts, and cooperating means on said reciprocable means and said cranks for guiding said cranks as the same are detached from said shafts.

10. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame, cranks pivotally connected with said links and mounted to detachably engage and swing about said shafts to align the pivots connecting said links to each other with the pivots connecting said first mentioned links and said member and the axes of said shafts, and cooperating means on certain of said links and said cranks for guiding said cranks after the same disengage from said shafts.

11. Means for moving a member back and forth and locking the same in position at the end of its movement in one direction, comprising a frame having guiding means for said member, links pivotally connected with said member, shafts fixed on said frame, and means for moving each of said links into and out of a position between and in alignment with a pivot and a shaft, comprising a crank pivotally connected with said link and detachably engaging said shaft to pivot around the same adjacent its pivotal connection with said link, said links having curved end enlargements at the ends thereof and said cranks having concave sockets in the outer face thereof receiving said enlargements.

12. Means for moving a member back and forth and locking the same in position at the end of its movement in one direction, comprising a frame having guiding means for said member, reciprocable means, short links pivotally connected with said reciprocable means, long links pivotally connected with said member and with said first mentioned links, shafts fixed on said frame and cranks pivotally connected with both said long and short links and mounted to sucessively swing into engagement with and about said shafts to align the pivots connecting said long and short links with the pivots connecting said long links and said member and the axes of said shafts.

13. Means for moving a member back and forth and locking the same in position at the end of its movement in one direction, comprising a frame having guiding means for said member, reciprocable means, short links pivotally connected with said reciprocable means, long links pivotally connected with said member and with said first mentioned links, shafts fixed on said frame and cranks pivotally connected with both said long and short links mounted to swing about said shafts to align the pivots connecting said long and short links with the pivots connecting said long links and said member and the axes of said shafts, said member and said cranks having concave bearing sockets formed therein and said long links each having a curved end enlargement at each end thereof, one of said enlargements fitting in the bearing socket in a crank and the other enlargement fitting in one of the bearing sockets in said member.

14. Means for moving a member back and forth and locking the same in position at the end of its movement in one direction, comprising a frame having guiding means for said member, reciprocable means, short links pivotally connected with said reciprocable means, long links pivotally connected with said member and with said first mentioned links, shafts fixed on said frame and members pivotally connected with said links and having hook-like bearing portions detachably engaging with said shafts to swing said members about the same to align the pivotal connection between each long link and member having said hook-like portion with its pivotal connection with said first mentioned member and the axis of the cooperating shaft, said long links having enlargements at the ends thereof and said members having sockets receiving said enlargements.

15. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and members pivotally connected with said links and having hook-like bearing portions detachably engaging with said shafts to swing said members about the same, said reciprocable means and said hook-like portions having cooperating means thereon to move said hook-like portions into rotative engagement with said shafts.

16. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and members pivotally connected with said links and having hook-like bearing portions detachably engaging with said shafts to swing said members about the same, said reciprocable means and said hook-like portions having cooperating means thereon to move said hook-like portions into rotative engagement with said shafts, and hold the same in such engagement during rotation thereof.

17. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame and members pivotally connected with said links and having hook-like bearing portions detachably engaging with said shafts to swing said members about the same, said reciprocable means and said hook-like portions having cooperating means thereon to hold said hook-like portions in rotative engagement with said shafts during a portion of the releasing movement thereof and guide said hook-like portions toward shaft disengaging position to complete the release of said shafts by said hook-like portions.

18. Means for moving a member back and forth and locking the same in position at the end of its movement in one direction, comprising a frame having guiding means for said member, reciprocable means, links pivotally connected with said reciprocable means, links pivotally connected with said member and with said first mentioned links, shafts fixed on said frame, cranks pivotally connected with said links and mounted to detachably engage and swing about said shafts to align the pivots connecting said links to each other with the pivots connecting said first mentioned links and said member and the axes of said shafts, and means on said cranks engaging said shafts to guide said cranks during their return movement after detachment of said cranks from said shafts.

CARL ROEHRI.

REFERENCES CITED

The following references are of record in the file of this patent:

UNITED STATES PATENTS

| Number | Name | Date |
| --- | --- | --- |
| 196,669 | Jeffers | Oct. 30, 1877 |
| 395,857 | Taylor | Jan. 8, 1889 |
| 1,817,844 | Purcell | Aug. 4, 1931 |
| 2,186,030 | Lester | Jan. 9, 1940 |
| 2,287,417 | De Mattia | June 23, 1942 |
| 2,334,372 | Abbott et al. | Nov. 16, 1943 |
| 2,371,547 | Rosenlund et al. | Mar. 13, 1945 |
| 2,416,358 | Renier | Feb. 25, 1947 |